H. H. HODGSON.
TIRE.
APPLICATION FILED JULY 18, 1910.

977,628.

Patented Dec. 6, 1910.

WITNESSES:
W. G. McMillan
A. Campbell

INVENTOR.
H. H. Hodgson
BY Ridout & Maybee
ATTORNEY.

UNITED STATES PATENT OFFICE.

HOWARD H. HODGSON, OF TORONTO, ONTARIO, CANADA.

TIRE.

977,628.      Specification of Letters Patent.      Patented Dec. 6, 1910.

Application filed July 18, 1910. Serial No. 572,532.

*To all whom it may concern:*

Be it known that I, HOWARD H. HODGSON, of the city of Toronto, Province of Ontario, Canada, have invented certain new and useful Improvements in Tires, of which the following is a specification.

This invention relates to tires of the type in which a rubber tire is formed in sections having flanged bases held in contact with inwardly turned flanges on a recessed rim by means of a hoop spring. In such tires I have experienced much trouble owing to wearing of the flanges of the tire-sections and to lack of stiffness therein. Further trouble was experienced due to lack of connection between the sections. These troubles I have overcome by providing the base and flanges of each section with a metal sheath, shaped to receive an elastic pad and by interlocking the sections substantially as hereinafter more specifically described and then definitely claimed.

Figure 1:
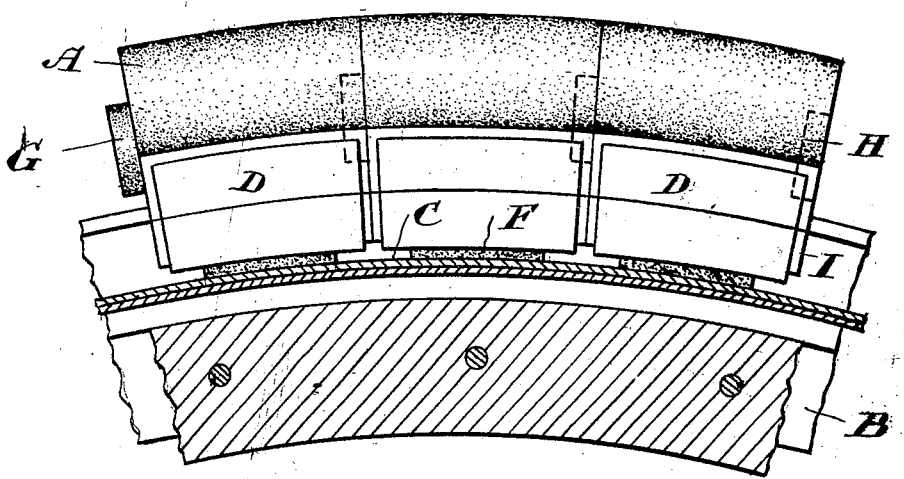
Figure 2:
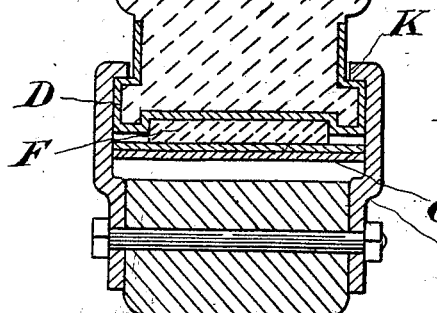
Figure 3:
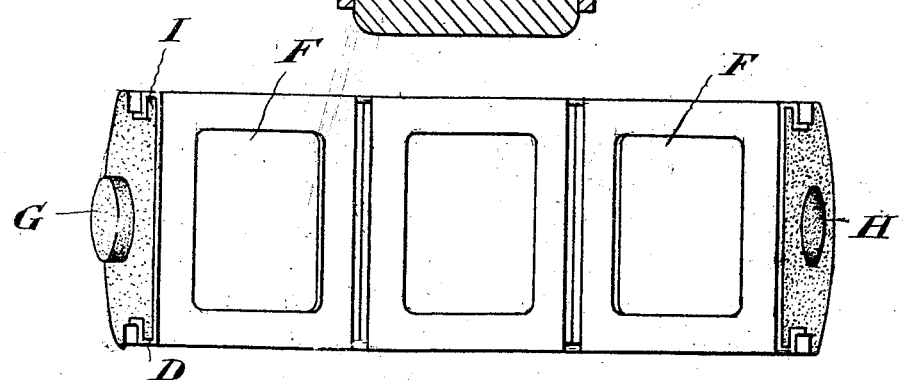

Figure 1 is a longitudinal section of part of a wheel rim showing three sections of the tire in side elevation. Fig. 2 is a cross section of the tire and rim. Fig. 3 is a plan view and the under side of the sections shown in Fig. 1.

A, are rubber tire sections each having lateral flanges I formed on its base.

D, are metal sheaths into which the sections are molded and which are fitted to the base and flanges of each section and extend part way up the neck thereof. These metal sheaths are preferably shorter than the sections of the tire so that adjacent sheaths do not meet and an elastic cushion is formed between the sections. This feature is of importance, as otherwise flexibility of the tire under radial pressure would be interfered with.

A depression L is formed in the under side of each metal sheath into which are fitted rubber pads to form cushions F. These cushions F engage the hoop spring C which is fitted within the recess formed in the fixed metal rim B which is provided with inwardly turned flanges K which engage the upper sides of the flanges of the tire sections A. These cushions F ease the jar of the section of the hoop spring when the wheel is running on the road.

As it is desirable that the sections should be so held together as to properly hold them in alinement, I preferably provide each section with a projection G, adapted to fit into a similarly shaped recess H formed in the adjacent section which interlocking, however, does not interfere with the resiliency of the individual section under radial pressure.

It will be found that a tire provided with my improvements will possess great durability with no decrease in elasticity as compared with similar tires unprovided with these improvements.

What I claim as my invention is:—

A vehicle tire comprising a fixed recessed rim provided with inwardly extended circular flanges; a rubber tire formed in sections provided with laterally extending flanges fitting under the aforesaid rim flanges; metal sheaths embracing the bases and flanges of said sections and each provided with a depression in its under side; rubber cushions partly received in said depressions; and spring means engaging said cushions to press the rubber tire outwardly.

Dated at Toronto this 25 day of June, 1910.

HOWARD H. HODGSON.

Signed in the presence of—
D. S. TOUELL,
H. M. CHRISTMAN.